No. 718,288. PATENTED JAN. 13, 1903.
R. F. SPROULE.
APPLIANCE FOR BALANCING END PRESSURE IN LENGTHS OF PIPE.
APPLICATION FILED JULY 22, 1902.
NO MODEL.
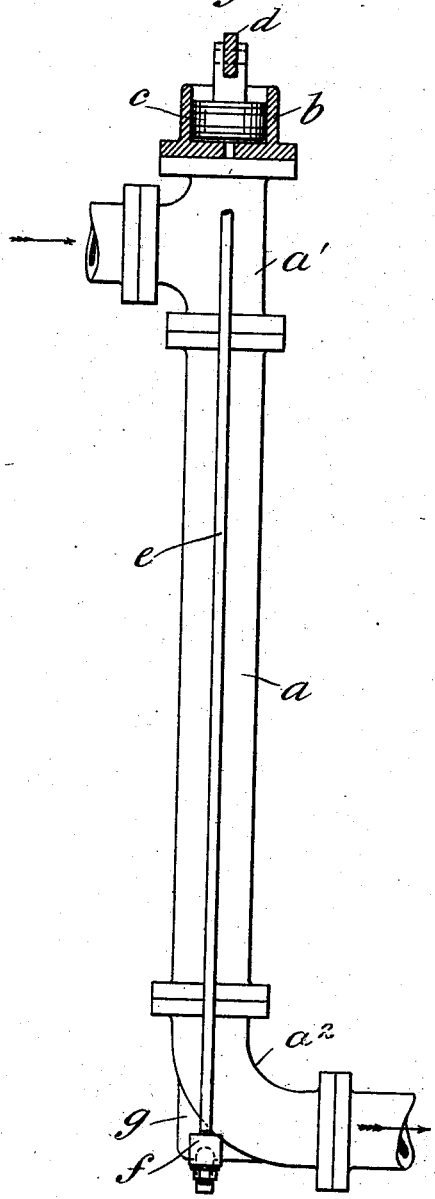
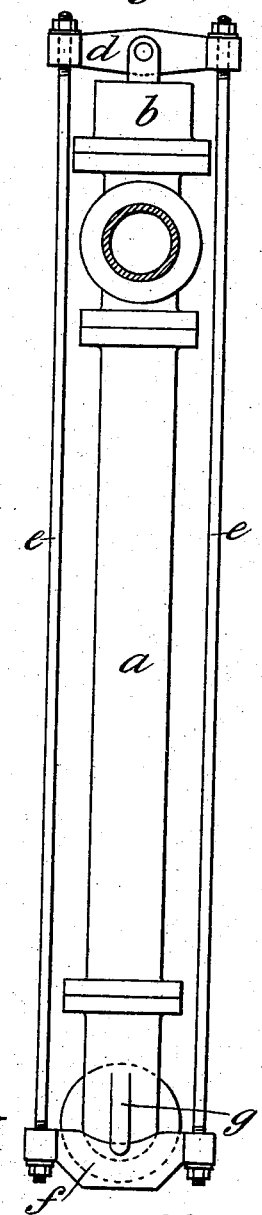
Witnesses:
Inventor
Robert F. Sproule
By James L. Norris
Atty

UNITED STATES PATENT OFFICE.

ROBERT F. SPROULE, OF LONDON, ENGLAND.

APPLIANCE FOR BALANCING END PRESSURE IN LENGTHS OF PIPE.

SPECIFICATION forming part of Letters Patent No. 718,288, dated January 13, 1903.

Application filed July 22, 1902. Serial No. 116,589. (No model.)

*To all whom it may concern:*

Be it known that I, ROBERT FRITH SPROULE, a citizen of England, residing at 205 Uxbridge road, in the county of London, England, have invented a certain new and useful Appliance for Balancing End Pressure in Lengths of Pipe, (for which I have applied for a patent in Great Britain, dated January 11, 1902, No. 845,) of which the following is a specification.

When a length of pipe extending between two fixed points is subjected to high internal pressure, the stress upon the connections or at the ends of the pipe is liable to break joints or to cause other damage, and this is especially the case when the pipe has an expansion-joint in its course.

My invention relates to means of preventing the stress and damage that might occur in such cases by balancing the end pressure in the manner shown by the accompanying drawings.

Figure 1 is a side view, and Fig. 2 is a front view, of a length of pipe between two lateral branches provided with means according to my invention of balancing the pressure tending to break the joints.

To either end of the pipe $a$ I fix a short cylinder $b$, preferably of the same diameter as the pipe and communicating with it. In this cylinder I fit a piston $c$, connected to a cross-head $d$, from which two or more ties $e$ extend parallel to the pipe to its farther end, where they are secured to a cross-head $f$ or the like bearing against a projection $g$ on the end of the pipe. The pressure in the cylinder being the same as that in the pipe acts on the piston $c$, tending to force it out of the cylinder.

In all steam mains or pipes an expansion-joint is provided, so as to admit of lengthening or shortening of the main or pipe with varying temperatures. Whether these are made of copper and known as the "concertina" form or of the stuffing-box pattern they are notoriously unsafe, as in the first-named case the copper rapidly becomes crystalline in structure through the great heat and loses its ductility, and in the spigot form instances are known where the pressure of the steam has forced the spigot out of the stuffing-box and caused loss of life. This could not possibly happen where the pressure was balanced according to this invention, as the expansion-joint would be unaffected by the pressure, and consequently free to move in either direction. In most steam mains or pipes an injurious strain is thrown on the shell of the boiler, owing to the steam-pressure in the main between the engine and boiler tending to cant the stop-valve casing on the boiler-shell, and to remedy this is the object of my invention. For example, a steam-pipe measuring one hundred feet in length will lengthen or expand a little more than four inches when carrying steam at one hundred and fifty pounds pressure and proportionately less at lower pressure. The ties $e$ remain at practically the same length, and while the cylinder $b$ moves relatively to the piston $c$ the end pressure is always balanced no matter how the length of the pipe may vary. When the temperature falls, the cylinder moves as before and constant equilibrium of pressure is maintained under all temperatures upon the inner and outer sides of the pipe-section $a^2$.

The ties $e$ may be bolts, as shown, or wire ropes.

Having thus described the nature of this invention and the best means I know of carrying the same into practical effect, I claim—

1. The combination of a plurality of pipe-sections, a cylinder communicating with one of said pipe-sections, a piston in said cylinder, and means connected with the piston and arranged to act against the end of the other pipe-section to transfer the pressure acting on the piston to the outer end of said last-named pipe-section.

2. The combination of a pipe-section having branches at its opposite ends, one of the branches having a projection, a cylinder communicating with the other branch, a cross-head bearing against said projection, a second cross-head connected with the piston, and connections between said cross-heads.

In testimony whereof I have hereunto set my hand in presence of two subscribing witnesses.

ROBERT F. SPROULE.

Witnesses:
GERALD L. SMITH,
EDWARD GARDNER.